United States Patent
Benito et al.

(10) Patent No.: US 8,186,950 B2
(45) Date of Patent: May 29, 2012

(54) AERODYNAMIC DEVICE FOR DETECTION OF WIND TURBINE BLADE OPERATION

(75) Inventors: Pedro L. Benito, Rheine (DE); Eugenio Yegro, Madrid (ES); Po Wen Cheng, Delft (NL)

(73) Assignee: General Electric Company, Schenectady, NY (US)

( * ) Notice: Subject to any disclaimer, the term of this patent is extended or adjusted under 35 U.S.C. 154(b) by 731 days.

(21) Appl. No.: 12/342,599

(22) Filed: Dec. 23, 2008

(65) Prior Publication Data

US 2010/0158688 A1    Jun. 24, 2010

(51) Int. Cl.
*F03D 7/04*    (2006.01)

(52) U.S. Cl. ............................. 416/39; 416/61

(58) Field of Classification Search ............ 416/39, 416/61
See application file for complete search history.

(56) References Cited

U.S. PATENT DOCUMENTS

| | | | |
|---|---|---|---|
| 6,729,846 B1 | 5/2004 | Wobben | |
| 7,086,834 B2 | 8/2006 | LeMieux | |
| 7,708,524 B2 * | 5/2010 | Sundermann et al. | 416/39 |
| 2004/0013512 A1 | 1/2004 | Corten | |
| 2005/0242233 A1 | 11/2005 | Battisti | |
| 2006/0034692 A1 | 2/2006 | Grabau | |
| 2007/0154310 A1 | 7/2007 | Wobben | |
| 2008/0078228 A1 | 4/2008 | Nies | |
| 2008/0175711 A1 | 7/2008 | Godsk et al. | |
| 2009/0169378 A1 * | 7/2009 | Menke | 416/1 |
| 2010/0158687 A1 * | 6/2010 | Dawson et al. | 416/31 |

FOREIGN PATENT DOCUMENTS

| | | |
|---|---|---|
| EP | 1936186 A2 | 6/2008 |
| EP | 1944505 A1 | 7/2008 |
| WO | 2008113350 A2 | 9/2008 |

* cited by examiner

*Primary Examiner* — Dean O Takaoka
*Assistant Examiner* — Alan Wong
(74) *Attorney, Agent, or Firm* — Dority & Manning, P.A.

(57) ABSTRACT

An aerodynamic device is provided for detection of physical conditions of wind turbine blade operation. One or more vibration sensors are mounted on the blades in an aerodynamic housing and configured to monitor a physical condition of the blades that varies in accordance with a vibration of the housing. A processor is operably coupled to the one or more vibration sensors. The processor may be configured to use the vibration frequency of a component of the blade to determine the physical condition of the blade, and generate a signal indicating the physical condition of the blade when determined.

28 Claims, 6 Drawing Sheets

AERODYNAMIC DEVICE FOR DETECTION OF WIND TURBINE BLADE OPERATION

BACKGROUND OF THE INVENTION

The invention relates generally to wind turbine blade operation and more specifically to an aerodynamic device for detection of wind turbine blade operation.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted within a housing or nacelle, which is positioned on top of a truss or tubular tower. Utility grade wind turbines (i.e., wind turbines designed to provide electrical power to a utility grid) can have large rotors (e.g., 40 or more meters in diameter). Blades on these rotors transform wind energy into a rotational torque or force that drives one or more generators, rotationally coupled to the rotor through a gearbox. The gearbox steps up the inherently low rotational speed of the turbine rotor for the generator to efficiently convert mechanical energy to electrical energy, which is fed into a utility grid.

Operators of windfarms want the wind turbines to operate continuously and with maximum efficiency to provide the most return on their investment. Operational conditions that interfere with continuous operation and maximum efficiency are undesirable and should be avoided. Two operational conditions of the wind turbine blade that may interfere with the efficient operation of the blade and hence the wind turbine power output are blade icing and blade stall.

Under some atmospheric conditions, the rotor blades become covered with ice. Ice buildup typically occurs on the leading edge of the airfoil and causes a reduced lifting capability. As the ice layer becomes increasingly thick, weight is added to the airfoil so that the lifting airfoil surface becomes modified. For wind turbines, this modification can result in diminished aerodynamic rotor blade performance. This reduced performance can directly result in increased system loads and/or lost power output.

Buildup of ice on the blades can also create a serious hazard to personnel and equipment beneath the blades. Heavy ice formations on the blade may come loose during operation and fall to the ground from heights of 100 meters or more.

A motion of a wind turbine blade with respect to the wind divides an airflow between the pressure side and the suction side. The airfoil shape of the wind turbine blade causes faster flow over the suction side than the pressure side resulting lower pressure on the suction side than the on the pressure side, creating a net force on the blade resulting in motion of the blade (comparable to lift for an airplane wing). However, if the angle of attack of the blade with respect to the wind becomes too great, all of a sudden the airflow on the upper surface stops sticking to the surface of the wing. Instead the air whirls around in an irregular vortex (a condition which is also known as turbulence). Lift from the low pressure on the upper surface of the wing quickly disappears. This phenomenon is known as stall.

Stall may occur on different parts of the blade at different times based on the localized conditions. However, stall results in lower blade performance and consequently a lower power being generated by the wind turbine. If stall conditions occur over an increasingly greater portion of the blade, wind turbine power output will progressively degrade.

Accordingly, there is a need to provide a method for detection of abnormal operation due to ice buildup or stall conditions so as to be able to reduce downtime and enhance efficient operation for the wind turbine.

BRIEF DESCRIPTION OF THE INVENTION

The present invention relates to a device and method for monitoring operating conditions of a wind turbine blade and determining when a physical condition exists. Briefly in accordance with one aspect of the present invention, a wind turbine is provided. The wind turbine includes a rotor having at least one blade. One or more vibration sensors are mounted on the blades and configured to monitor a physical condition of the blades that varies in accordance with a vibration of an component of the blade. A processor is operably coupled to the one or more vibration sensors. The processor may be configured to use the vibration frequency of the component of the blade to determine the physical condition of the blade, and generate a signal indicating the physical condition of the blade when determined.

According to a second aspect of the present invention, a method is provided for detecting a physical condition of a wind turbine blade of a wind turbine rotor, having one or more rotor blades. The method includes monitoring at least one physical condition of the wind turbine in operation that varies in accordance with a vibration of a component of the blade. A vibration frequency of one or more vibration sensors mounted to the component of the blade is monitored. The method includes determining by a processor, the physical condition of the blade according to the vibration frequency of one or more vibration sensors mounted to the component of the blade. If the physical condition is determined to exist, then a signal is provided.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including providing early warning of physical conditions of a wind turbine blade condition that may lead to impaired performance of the wind turbine blade and reduced power output from the wind turbine. The warning may be provided to a wind turbine control system allowing system controls or an operator to take action to correct the impaired performance of the blade and restore expected power output for the wind condition. In particular, detection of blade icing and blade stall conditions may be identified, allowing for correction.

As used herein, a physical or meteorological parameter is "monitored" when a sensor is used to determine its present value. The broader term "monitored" is used rather than the narrower term "measured" to emphasize that the sensor may but need not necessarily provide a direct measurement of the parameter being monitored. For example, an anemometer used as a meteorological sensor may generate an analog signal relating to the present wind speed, but the analog signal is not an actual measurement of the wind speed. Nevertheless, this signal or a digital representation of the signal can be used to determine wind speed, or a design choice may be made to use the signal, its digital representation, or its representation with further processing as a proxy for wind speed.

Also as used herein, the term "meteorological sensor" refers to a sensor of a meteorological condition. A non-exhaustive list of meteorological conditions include, for example, air pressure, wind speed and direction, humidity, temperature, and precipitation and precipitation type. All of the example meteorological conditions are meteorological conditions relating to icing. A non-exhaustive list of some of the most commonly used meteorological sensors that monitor meteorological conditions relating to icing includes temperature and humidity sensors.

In addition, as used herein, the term "blade root" or "blade root section" refers to the inboard portion of a rotor blade.

Figure 1:
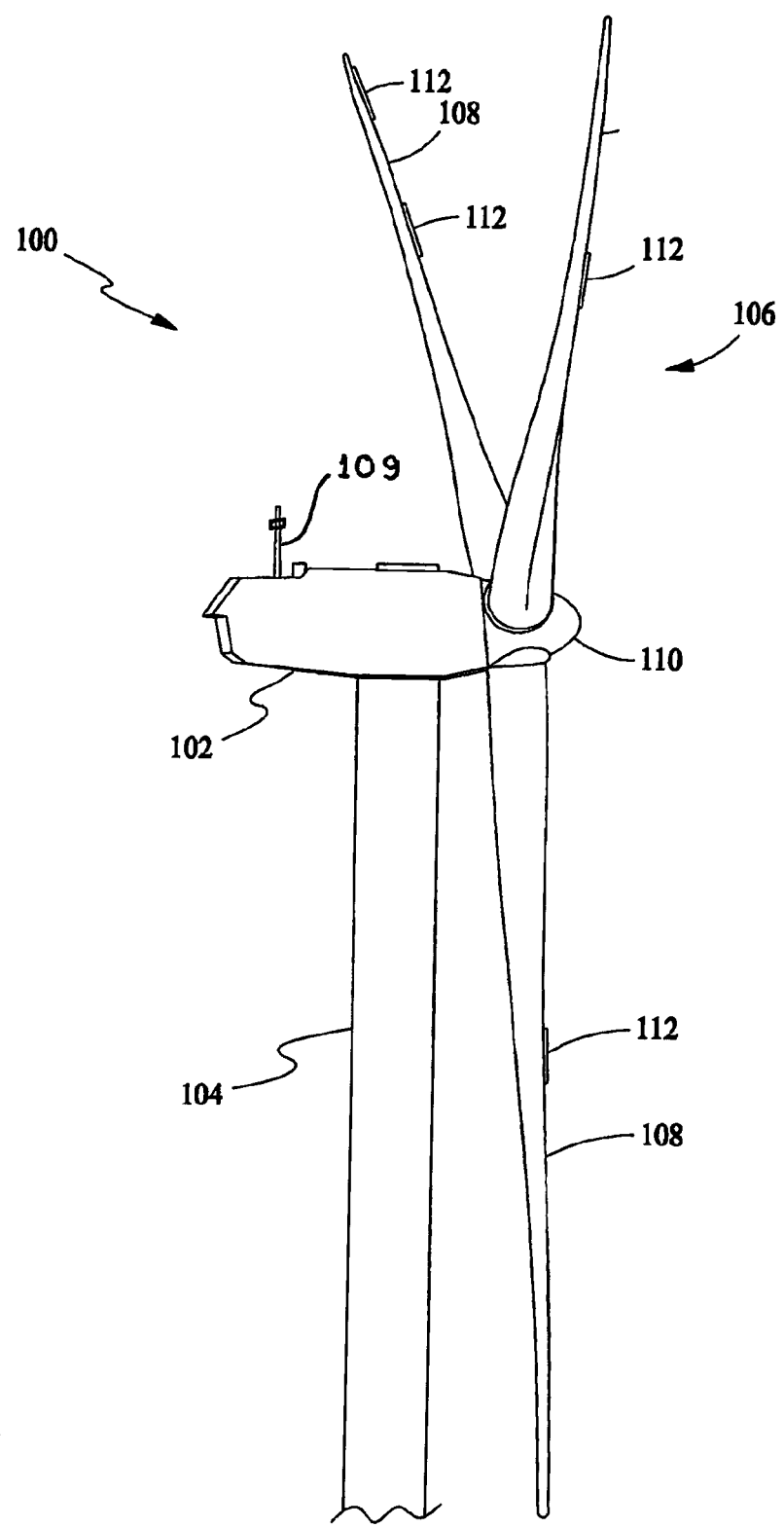
FIG. 1 is an illustration of an exemplary configuration for a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 includes three rotor blades 108, there are no specific limits on the number of rotor blades 108 required by the present invention. The nacelle 102 may also house meteorological sensors 109 for determining ambient conditions, such as wind speed, wind direction, ambient temperature, etc., related to a meteorological condition of the wind turbine blade.

As further explained herein, various embodiments of the present invention monitor vibration related to one or more physical conditions of a wind turbine blade in operation. The monitored vibration may indicate that one or more physical conditions exist for the blade. The meteorological sensors may further be used to monitor ambient conditions requisite for the one or more physical conditions of the blade to exist. Therefore, the monitored meteorological conditions may be used in conjunction with the monitored vibration to confirm the occurrence of the physical condition of the blade. Such physical conditions of the blade being monitored may include blade icing and blade stall.

Signals from the vibration sensors and from the meteorological sensors may be transmitted to a processor of the control system for the wind turbine for a determination of the existence of the physical condition of the blade. Communication between the vibration sensors and the meteorological sensors with the processor of the control system may be by known wired or wireless communications methods. The processor may employ a logic process to determine the existence of the physical condition and may issue warning and alarm signals to an operator or to the control system to provide for correction of the physical condition.

In some configurations of the present invention, to prevent false physical condition detection alarms, physical condition detection logic for the physical condition and/or physical condition logic is disabled if monitored meteorological parameter signals from meteorological sensors 109 indicate that the physical condition is improbable. However, it is permitted but not required for configurations of the present invention to provide a physical condition warning when meteorological sensors 102 indicate that the condition is improbable, but when vibration signals suggest the condition is indicated.

Figure 2A:
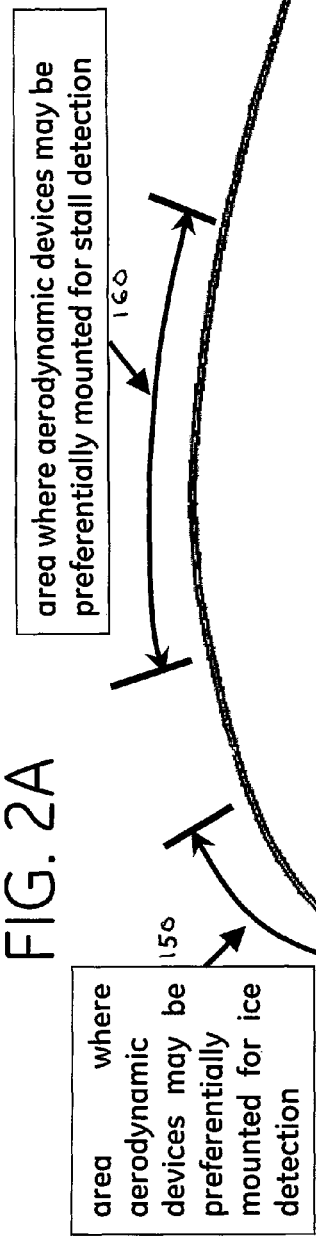
FIG. 2A illustrates a blade profile with areas identified for advantageous placement of aerodynamic devices with vibrations sensors for monitoring of icing conditions and stall conditions.
Figure 2B:
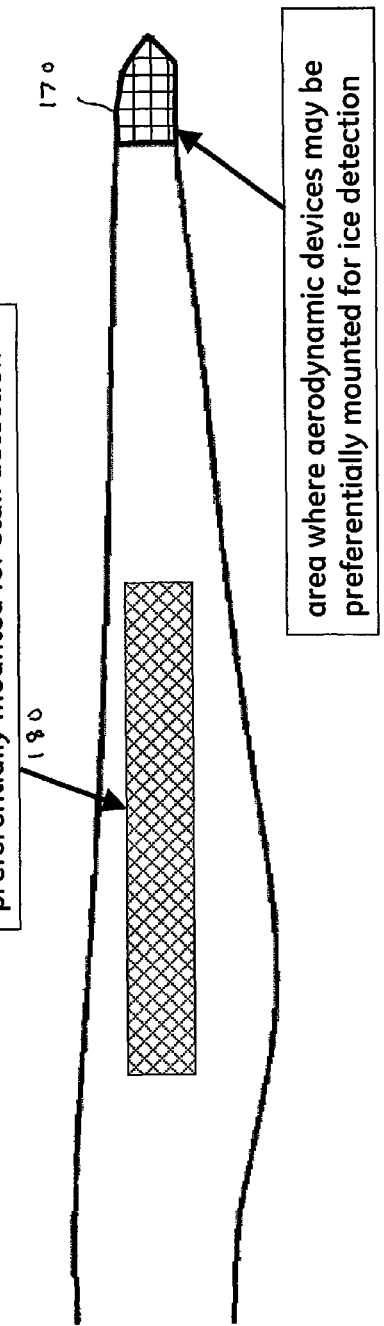
FIG. 2B illustrates a blade surface with areas identified for advantageous placement of aerodynamic devices with vibrations sensors for monitoring icing conditions and of stall conditions.

The meteorological conditions under which each blade operates are identical, but there is no guarantee that the resulting physical condition will manifest itself on each blade uniformly or identically. Further, each different physical condition may develop preferentially on some portion or section of the blade, such as surface area 112 (FIG. 1). For example, icing on a blade may occur preferentially on a leading edge and at a tip end. Stall may be experienced initially at a root section of the blade and at about 25% to 30% along a chord length of the blade. Therefore, early detection of the physical condition may be enhanced by advantageous placement of vibration sensors at locations of early incidence of the physical condition. For advantageous placement of vibration sensors related to blade icing, the sensor may preferentially be placed on a leading edge and at a tip end. For advantageous placement of vibration sensors related to blade stall, the sensor may preferentially be placed at a root section of the blade and at about 25% to 30% along a chord length of the blade. FIG. 2A illustrates a blade profile with areas identified for advantageous placement of aerodynamic devices with vibrations sensors for monitoring of icing conditions 150 and stall conditions 160. FIG. 2B illustrates a blade surface with areas identified for advantageous placement of aerodynamic devices with vibrations sensors for monitoring icing conditions 170 and of stall conditions 180. However, it should be understood that such aerodynamic devices may be installed at other locations on a blade for determining the occurrence of the physical conditions at those locations.

Vibration sensors may include accelerometers and piezoelectric devices. Vibrations sensors must be selected to provide satisfactory operation for environmental conditions of the wind turbine blade during operation, including temperatures as low as −40 degrees centigrade. The dimensions of the vibrations sensors are chosen to be small enough so when built into a housing do not adversely impact aerodynamic conditions of the blade. With the present state of technology, accelerometers may be as small as 4×4×1.5 mm. Output from the vibrations sensors may be transmitted to a processor through wired connections or wireless connection as known in the art. Further, for accelerometers and other like kinds of instrumentation, batteries may be provided locally with device. Further, the devices and the batteries may be arranged to permit replacement.

Housing for the vibration sensors on the blade surface should preferentially include aerodynamic housings. The housings may include existing structures on the surface of the blade but may also include specially provided structures that limit any impact on the aerodynamic performance of the blade. The existing structures may be preferentially utilized providing they are positioned on locations of the blade suitable for detection and preferentially early detection of the physical condition of the blade.

As an example of structures with a separate purpose, vortex generators on the blade surface may be utilized to house the vibration sensors. The use of vortex generators on wind turbine blades is known to counteract flow separation and stall on blades. Such existing structures may be used to house vibration sensors.

Figure 3A:
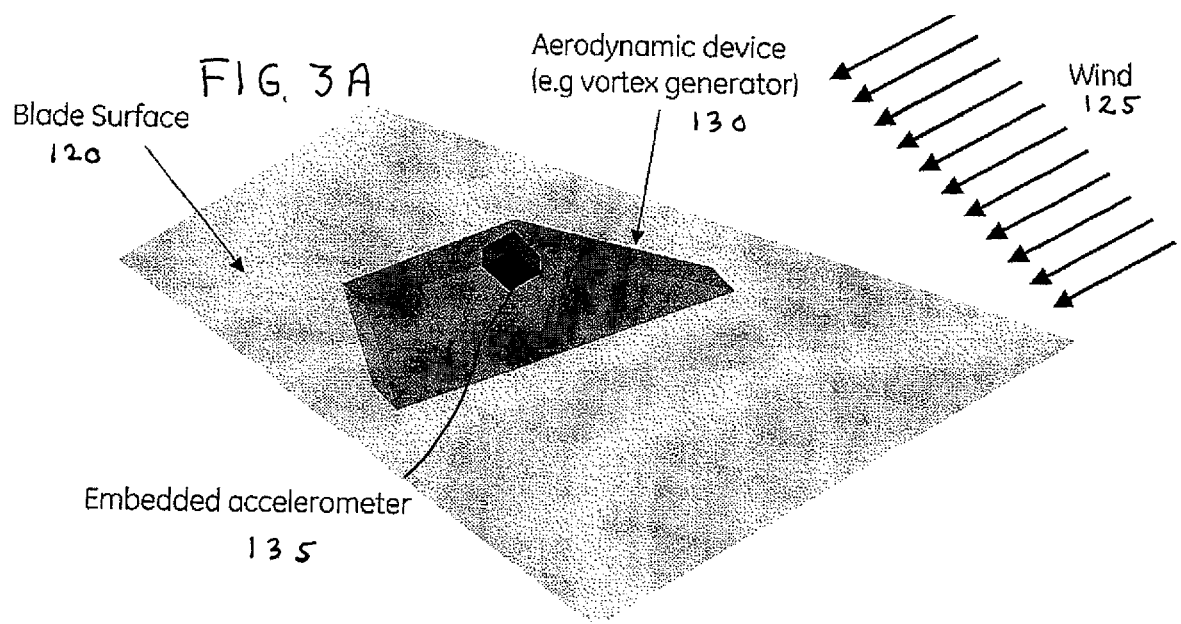
FIG. 3A illustrates an example of an aerodynamic device with embedded accelerometer on a blade surface in the presence of a wind flow.
Figure 3B:
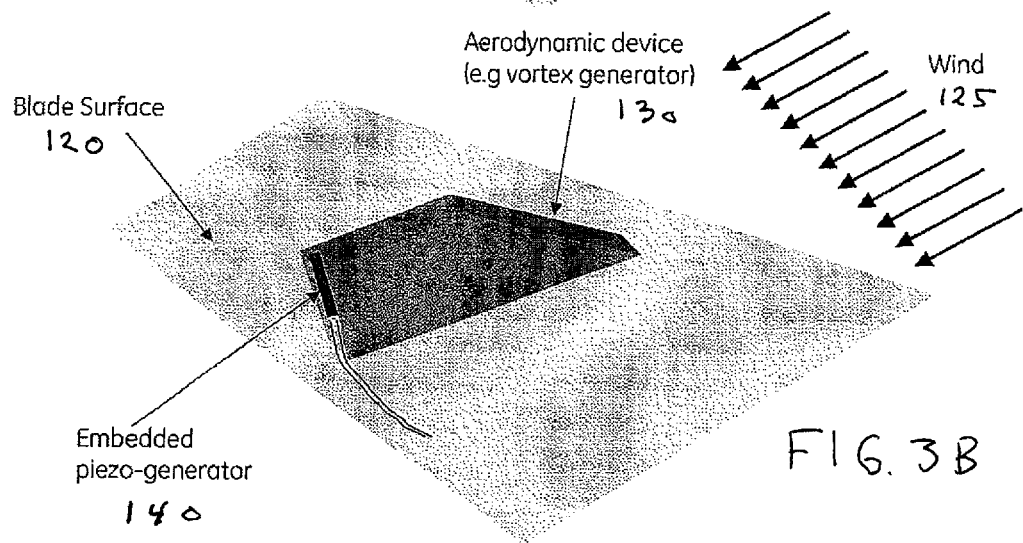
FIG. 3B illustrates a mounting of a piezoelectric sensor within an aerodynamic device on a blade surface in presence of a wind flow.

FIG. 3A illustrates an example of an aerodynamic device 130, such as a vortex generator, with embedded accelerometer 135 on a blade surface 120 in the presence of a wind flow 125. FIG. 3B illustrates a mounting of a piezoelectric sensor 140 within an aerodynamic device 130 on a blade surface 120 in presence of a wind flow 125.

Figure 4:
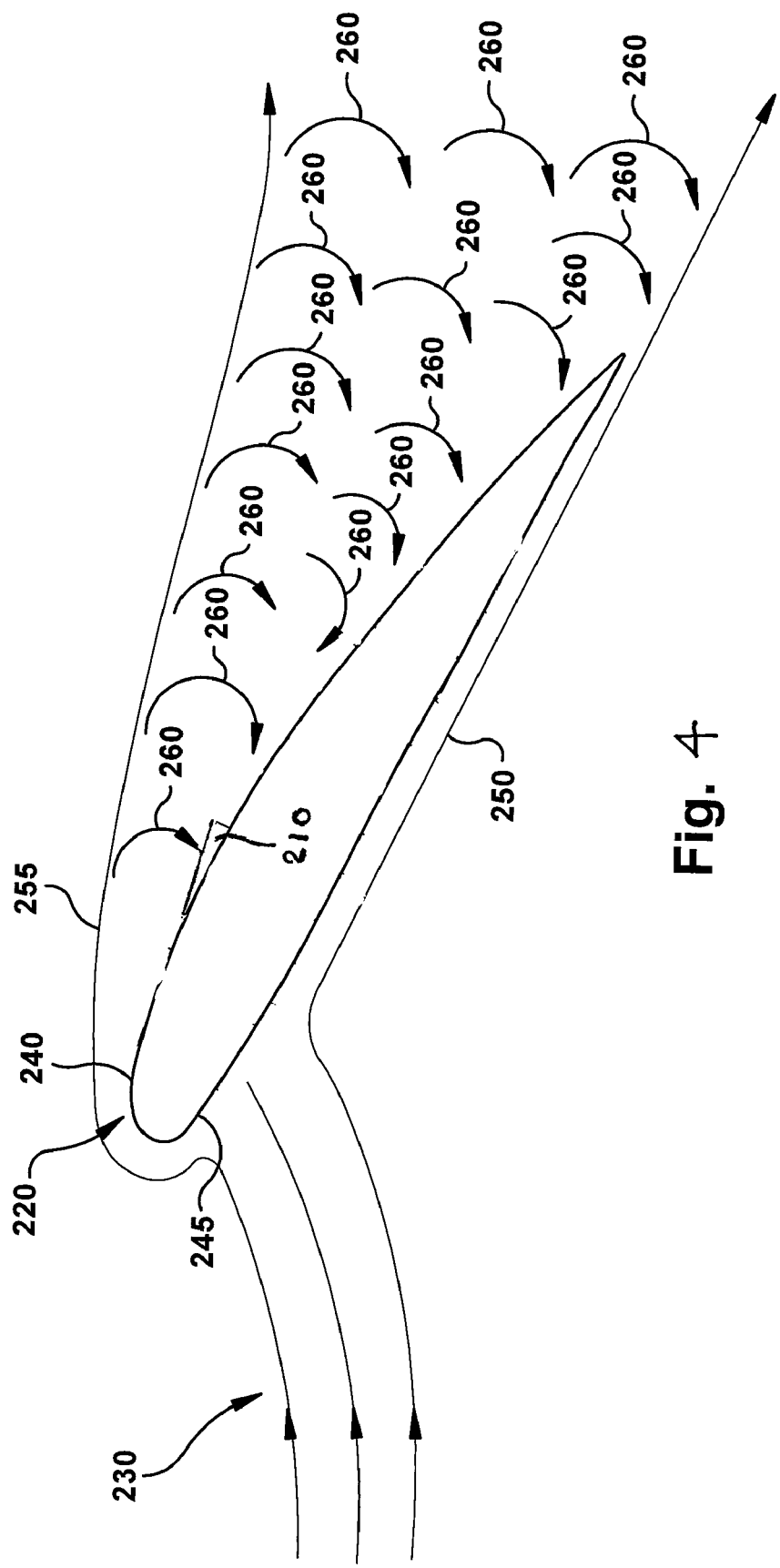
FIG. 4 illustrates an arrangement of the aerodynamic device mounted on an airfoil.

FIG. 4 illustrates an arrangement of the aerodynamic device 210 mounted on an airfoil 220. An incident airstream 230 impinges on the airfoil 220. The incident airstream 230 flows around the upper surface 240 and the lower surfaces 245 of the airfoil 220. The airfoil 220 is shown at stall, with a smooth airflow 250 along the lower surface 240, but a flow separation 255 creating a wake 260 above the upper surface 240. Turbulent air created by the stall.

A principle of operation is that this device is normally vibrating while the wind turbine is in operation. A lowering of the frequency of the vibration or no vibration indicates the presence of ice on the aerodynamic device.

More specifically, the processor for the wind turbine controller may store data with respect to normal range of vibration during wind turbine operation. Such data may include the range of vibration base on important wind turbine parameters such as speed of blade rotation, pitch angle and wind conditions. These parameters and other important operational parameters are monitored during wind turbine operation and are available to the processor. When the frequency of vibration for the vibration sensor deviates below the normal range of vibration for the operational parameters of the blade (such as with respect to blade rotation, pitch angle and wind conditions), then the processor may determine that an icing condition exists for the blade. Further, the processor may consider the meteorological data, specifically ambient temperature as a further determination as to whether blade ice conditions may exist. For example, it would be expected that ice would form on the blade with ambient temperature below 0 degrees centigrade.

Such a vibration monitoring for a small aerodynamic device on the blade, advantageously located for determination of an icing condition offers a more sensitive determination of incipient blade icing than sensing vibration for the blade as a whole as a determinant of icing condition. In the latter case, a substantially greater mass of ice would need to be formed before a vibration response for the blade as a whole would discern such a condition.

With respect to a stall condition, a rise in frequency of vibration may indicate stall conditions at the aerodynamic device location on the blade, as a turbulence of air created by the stall condition increases the vibration of the aerodynamic device and hence the vibration of the sensor therein. More specifically, as described above the processor for the wind turbine controller may store data with respect to normal range of vibration during wind turbine operation. Such data may include the range of vibration base on important wind parameters such as speed of blade rotation, pitch angle and wind conditions. These parameters and other important operational parameters are monitored during wind turbine operation and are available to the processor. When the frequency of vibration for the vibration sensor deviates above the normal range of vibration for the operational conditions of the blade (such as with respect to blade rotation, pitch angle and wind conditions), then the processor may determine that a stall condition exists for the blade. Such increased frequency of vibration may be caused by air turbulence of the blade caused by the stall condition.

Figure 5:
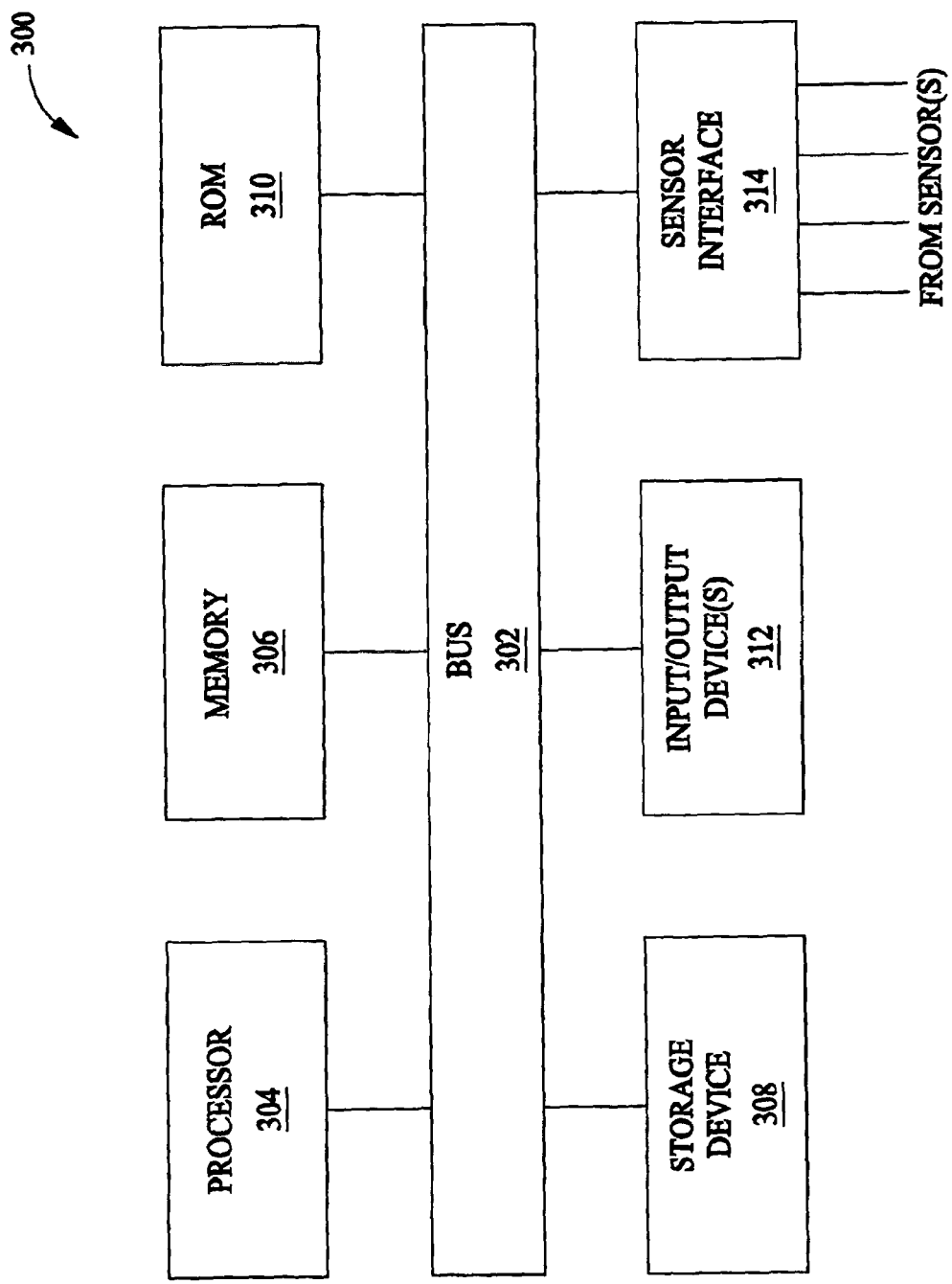
FIG. 5 is a block diagram of one embodiment of a wind turbine controller.

In some configurations and referring to FIG. 5, a turbine controller 300 includes a bus 302 or other communications device to communicate information. Processor(s) 304 are coupled to bus 302 to process information, including information from various sensors (for example, sensors 112, 135, and 140) to determine whether a physical condition is present. Turbine controller 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Turbine controller 300 can also include read only memory (ROM) and or other static storage device 310, which is coupled to bus 302 to store and provide static (i.e., non-changing) information and instructions to processor(s) 304. Input device(s) at 312 can include any of the physical condition monitoring devices described herein or known in the art to provide input data to turbine controller 300. Output devices at 312 can include devices that provide visual and/or audible indications to an operator console (also not shown in FIG. 8), or to an automatic apparatus that acts on or relays such information. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions.

Sensor interface 314 is an interface that allows turbine controller 300 to communicate with one or more sensors within a wind turbine, including sensors used for determination of vibration and other sensors related to wind turbine operation such as blade rotational speed, pitch angle and wind conditions. Sensor interface 314 can be or can comprise, for example, one or more analog-to-digital converters that convert analog signals into digital signals that can be used by processor(s) 304.

When a determination of a physical condition of the blade has been made by the processor, the controller may provide a response to correct the condition. In response to a determined icing condition, the control system may initiate corrective action including: at least one of oscillating a pitch of the at least one blade; changing a rotational speed of the wind turbine; shutting down and starting up the wind turbine; and reducing power of the wind turbine. If a heating device is installed in the blades, the control can switch on or off the heating devices. In response to a determined stall condition, the control system may initiate corrective action including: at least one of pitching one or more blades towards feather and/or modifying rotational speed.

Figure 6:
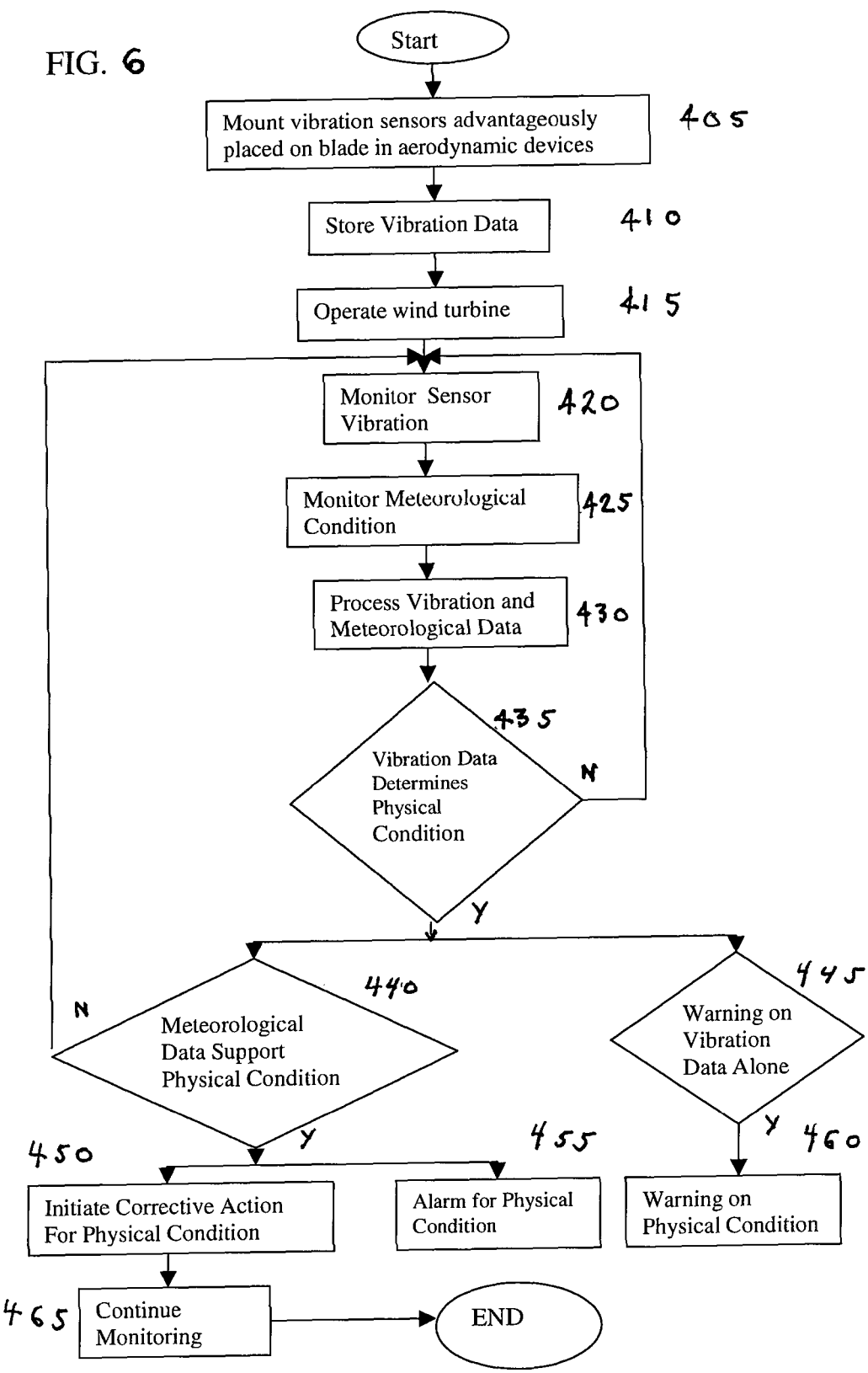
FIG. 6 provides a flow chart of an embodiment of a method for detecting a physical condition of a wind turbine blade according to vibration monitoring of aerodynamic devices advantageously positioned on the blade.

According to a further embodiment of the present invention a method may be provided for detecting a physical condition of a wind turbine blade having a rotor and one or more rotor blades. FIG. 6 provides a flow chart of an embodiment of a method for detecting a physical condition of a wind turbine blade according to vibration monitoring of aerodynamic devices advantageously positioned on the blade. In step 405, vibration sensors are provided within aerodynamic devices positioned advantageously on blade surfaces for identifying various physical conditions of the blade. In step 410, data provided through operating test information and computer analysis to identify a range of vibration for aerodynamic devices mounted on blade for normal operating conditions and abnormal operating conditions is stored in a processor or like instrument of the control system for the wind turbine.

The wind turbine is operated in step 415. Vibration sensors are monitored during the wind turbine operation in step 420. In step 425, meteorological data is monitored during wind turbine operation. The data from vibration sensors and meteorological sensors is processed and analyzed in step 430. If vibration data fall outside the normal range associated with a physical condition in step 435, a determination may be made that a physical condition exists. Based on this determination of the physical condition, then a warning may be issued for an operator or for the controller in step 460.

An example of vibration data determinative of icing is vibration frequency from one or more vibration sensors dropping below the normal range for the operating conditions or falling to zero. An example of vibration data determinative of stall respect is vibration frequency from one or more vibration sensors increasing above the normal range for the operating conditions. If no determination is made of the physical condition, then monitoring of vibration data may continue per step 420. In step 440, analysis of meteorological data may support the determination that the physical condition exists. If the meteorological data supports the determination that the physical condition exists, then corrective action may be initiated to alleviate the physical condition. Also an alarm may be provided to alert the operator and or control system to the existence of the physical condition. An example of one confirmatory meteorological condition with respect to icing is ambient temperature below about 0 degrees centigrade.

While various embodiments are described herein, it will be appreciated from the specification that various combinations of elements, variations or improvements therein may be made, and are within the scope of the invention.

What is claimed is:

1. A wind turbine comprising:
  a rotor having at least one blade;
  a housing mounted on a blade surface of the at least one blade, the housing being configured as an aerodynamic device;
  at least one vibration sensor disposed in the housing, the at least one vibration sensor configured to monitor a physical condition of the at least one blade that varies in accordance with a vibration frequency of the housing; and
  a processor operably coupled to the at least one vibration sensor, the processor configured to use the vibration frequency of the housing to determine the physical condition of the at least one blade and generate a signal indicating the physical condition of the at least one blade when determined.

2. The wind turbine according to claim 1, further comprising: at least one of a wired signal or a wireless signal providing the vibration frequency from the at least one vibration sensor to the processor.

3. The wind turbine according to claim 1, wherein the at least one vibration sensor comprises at least one of an accelerometer and a piezoelectric device.

4. The wind turbine according to claim 1, further comprising:
  at least one meteorological sensor configured to monitor meteorological conditions related to the at least one blade, wherein the processor is operably coupled to the at least one meteorological sensor and further wherein the processor is configured to determine the physical condition of the at least one blade when the meteorological conditions are determined to be consistent with the physical condition of the at least one blade.

5. The wind turbine according to claim 4, wherein the meteorological condition consistent with an icing of the at least one blade comprises: an ambient temperature below 0 degrees centigrade.

6. The wind turbine according to claim 1, wherein the housing is configured as a vortex generator.

7. The wind turbine according to claim 1, wherein the physical condition being determined comprises: icing of the at least one blade.

8. The wind turbine according to claim 7, wherein a position of the housing on the blade surface is selected according to at least one of past experience with icing, computerized flow dynamics; and blade design analysis.

9. The wind turbine according to claim 7, wherein the housing is mounted on the blade surface in proximity to at least one of a leading edge and a tip of the at least one blade.

10. The wind turbine according to claim 7, the determination of icing on the at least one blade by the processor comprising:
  a stored information for of vibration frequency for the at least one vibration sensor disposed in the housing according to a rotation speed, a blade pitch and wind conditions for wind turbine operation;
  a determination when blade icing occurs according to a deviation of vibration frequency for the at least one vibration sensor from the stored information according to the rotation speed, the blade pitch and wind conditions for operation of the wind turbine; and
  a determination that meteorological conditions allow blade icing.

11. The wind turbine according to claim 10, further comprising: a response to icing including: at least one of oscillating a pitch of the at least one blade; changing a rotational speed of the wind turbine: shutting down and starting up the wind turbine: and reducing power of the wind turbine.

12. The wind turbine according to claim 1, wherein the physical condition being determined comprises: a stall of the at least one blade.

13. The wind turbine according to claim 12, the determination of stall on the at least one blade by the processor comprising:
  a stored information for vibration frequency for the at least one vibration sensor disposed in the housing according to a rotation speed, a blade pitch and wind conditions for wind turbine operation; and
  a determination when blade stall occurs according to a deviation of vibration frequency for the at least one vibration sensor from the stored information according to the rotation speed, the blade pitch and wind conditions for operation of the wind turbine.

14. The wind turbine according to claim 12, wherein the housing is mounted on the blade surface in proximity to a root of the at least one blade and along a range of approximately 25% to 30% of blade chord length.

15. The wind turbine according to claim 12, wherein a position of the housing on the blade surface is selected according to at least one of past experience with stall, computerized flow dynamics; and blade design analysis.

16. A method comprising:
monitoring at least one physical condition of a blade of a wind turbine in operation that varies in accordance with a vibration of a housing mounted on a blade surface of the blade, the housing being configured as an aerodynamic device;
measuring a vibration frequency of at least one vibration sensor mounted disposed in the housing;
determining by a processor the at least one physical condition of the blade according to the vibration frequency of the at least one vibration sensor; and
signaling the at least one physical condition of the blade when the at least one physical condition is determined to exist.

17. The method according to claim 16, wherein determining by the processor the at least one physical condition of the blade according to the vibration frequency of the at least one vibration sensor comprises:
storing information for vibration frequency for the at least one vibration sensor disposed in the housing according to a rotation speed, a blade pitch and wind conditions for wind turbine operation; and
determining when blade stall occurs according to a deviation of vibration frequency for the at least one vibration sensor from the stored information according to the rotation speed, the blade pitch and wind conditions for operation of the wind turbine.

18. The method according to claim 16, further comprising:
monitoring meteorological conditions relating to the at least one physical condition of the blade; and
determining by the processor whether the monitored meteorological conditions are consistent with the at least one physical condition of the blade as determined by the processor.

19. The method according to claim 16, wherein measuring the vibration frequency of at least one vibration sensor disposed in the housing comprises measuring the vibration frequency with at least one of an accelerometer and a piezoelectric device disposed in the housing and further comprising:
transmitting a signal to the processor, wherein the signal represents the measured vibration frequency of the housing.

20. The method according to claim 16, further comprising positioning the housing at a location on the blade surface that is selected to promote monitoring of the at least one physical condition.

21. The method according to claim 16, wherein the at least one physical condition of the blade comprises: icing of the blade.

22. The method according to claim 21, further comprising: determining whether an ambient temperature is below 0 degrees centigrade.

23. The method blade according to claim 21, further comprising:
positioning the housing on the blade surface at a location that is selected according to at least one of past experience with icing, computerized flow dynamics; and blade design analysis.

24. The method according to claim 21, further comprising:
positioning the housing in proximity to at least one of a leading edge of the blade and a tip of the blade.

25. The method according to claim 21, wherein determining by the processor the at least one physical condition of the blade according to the vibration frequency of the at least one vibration sensor comprises:
storing information for vibration frequency for the at least one vibration sensor disposed in the housing according to a rotation speed, a blade pitch mad wind conditions for wind turbine operation;
determining when blade icing occurs according to a deviation of vibration frequency for the at least one vibration sensor from the stored information according to the rotation speed, the blade pitch and wind conditions for operation of the wind turbine; and
determining that meteorological conditions allow blade icing.

26. The method according to claim 25, further comprising: responding to a determination of icing comprising at least one of oscillating a pitch of the blade; changing a rotational speed of the wind turbine; shutting down and starting up the wind turbine; and reducing power of the wind turbine.

27. The method according to claim 16, further comprising:
positioning the housing on the blade surface at a location that is selected according to at least one of past experience with stall of the blade, computerized flow dynamics, and blade design analysis.

28. The method according to claim 16, further comprising:
positioning the aerodynamic housing on the blade surface in proximity to a root of the blade and in proximity to a range of about 25% to 30% of the chord length.

* * * * *